United States Patent
Waters

(10) Patent No.: US 6,942,158 B2
(45) Date of Patent: Sep. 13, 2005

(54) MEMORY TAG AND A READER

(75) Inventor: John Deryk Waters, Bath (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/697,011

(22) Filed: Oct. 31, 2003

(65) Prior Publication Data

US 2004/0099738 A1 May 27, 2004

(30) Foreign Application Priority Data

Nov. 21, 2002 (GB) .............................. 0227149

(51) Int. Cl.⁷ .............................................. G06K 19/06
(52) U.S. Cl. .................... 235/492; 340/10.2; 340/572.1
(58) Field of Search ............................. 340/10.2, 10.33, 340/10.34, 10.4, 572.1; 235/375, 385, 492; 342/44, 385, 450

(56) References Cited

U.S. PATENT DOCUMENTS

| | | | | |
|---|---|---|---|---|
| 5,073,781 A | * | 12/1991 | Stickelbrocks | ............... 342/51 |
| 5,305,008 A | * | 4/1994 | Turner et al. | ................. 342/44 |
| 5,471,212 A | | 11/1995 | Sharpe et al. | |
| 5,523,749 A | * | 6/1996 | Cole et al. | ............... 340/10.34 |
| 6,265,963 B1 | * | 7/2001 | Wood, Jr. | ................. 340/10.4 |
| 6,398,116 B1 | | 6/2002 | Kreft | |
| 6,476,708 B1 | | 11/2002 | Johnson | |
| 2002/0089448 A1 | * | 7/2002 | Poliak et al. | ............... 342/385 |

FOREIGN PATENT DOCUMENTS

| | | |
|---|---|---|
| DE | 40 02 801 | 4/1991 |
| WO | WO 99/30401 | 6/1999 |

OTHER PUBLICATIONS

"Transponder: Arten und Reichweiten", http://web.archive.org/web/20021115010650/Http://www.nur-sicher heit.de/themen/zutrittskontrolle/identi.htm, as of Nov. 15, 2002.
"Verfolgungsjagd durchs Autowerk", IEE Automatisierung + Datentechnik, Mar. 2002.
"Keyless entry", http://www.all-electronics.de/news4d4b4303e11,print/html, Sep. 1, 2002.
English Translation of a German Office Action dated Aug. 27, 2004 issued in corresponding German Application No. 103 53 373.7–53, (6 pp.), Applicant: Hewlett-Packard Co.

* cited by examiner

*Primary Examiner*—Daniel Stcyr
*Assistant Examiner*—Daniel A. Hess
(74) *Attorney, Agent, or Firm*—Foley & Lardner LLP

(57) ABSTRACT

A memory tag comprising a resonant circuit part, a memory, a detector module and an output generator module, the resonant circuit part being operable to generate an output signal in response to a signal from a reader, the amplitude of the output signal dependent on the magnitude of the signal from the reader, the detector module being responsive to the magnitude of the output signal such that, when the magnitude of the output signal is relatively low, the detector module causes the output generator module to transmit an identifier signal, and when the magnitude of the output signal is relatively high, the detector module connects the memory to the resonant circuit part.

28 Claims, 3 Drawing Sheets

US 6,942,158 B2

MEMORY TAG AND A READER

FIELD OF THE INVENTION

This invention relates to a memory tag powered by a signal generated by a reader, and a reader.

BACKGROUND OF THE INVENTION

Memory tags in the form of Radio Frequency Identification (RFID) tags are well known in the prior art, and the technology is well established (see for example: RFID Handbook, Klaus Finkenzeller, 1999, John Wiley & Sons). RFID tags come in many forms but all comprise an integrated circuit with information stored on it and a coil which enables it to be interrogated by a read/write device generally referred to as a reader. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. In addition Hitachi has developed a memory tag referred to as a "mu-chip" which is a chip of 0.4 mm square and operates at 2.45 GHz. These smaller memory tags can be used in a variety of different applications. Some are even available for the tagging of pets by implantation.

Although it is known to provide tags with their own power source, in many applications the tag is also powered by the radio frequency signal generated by the reader. Such a known system is shown in FIG. 1 where a reader is indicated generally at 10 and a tag at 12. The reader 10 comprises a radio frequency generator 13 and a resonant circuit part 11, in the present example comprising an inductor 14 and a capacitor 15 connected in parallel. The inductor 14 comprises a antenna. The resonant circuit part will have a particular resonant frequency in accordance with the capacitance and inductance of the capacitor 15 and the inductor 14, and the frequency generator 13 is operated to generate a signal at that resonant frequency.

The tag 12 similarly comprises a resonant circuit part generally illustrated at 16, a rectifying circuit part generally indicated at 17 and a memory 18. The resonant circuit part 16 comprises an inductor 19 which again comprises in this example a loop antenna, and a capacitor 20. The resonant circuit part 16 will thus have a resonant frequency set by the inductor 19 and capacitor 20. The resonant frequency of the resonant circuit part 16 is selected to be the same as that of the reader 10. The rectifying part comprises a forward-biased diode 21 and a capacitor 22 and thus effectively acts as a half-ware rectifier.

When the reader 10 and the tag 12 are sufficiently close, a signal generated by the frequency generator 13 will cause the resonant circuit part 11 to generate a reader signal comprising a high frequency electromagnetic field. When the resonant circuit part 16 is moved within this field, a current will be caused to flow in the resonant circuit part 16, drawing power from the time varying magnetic field generated by the reader. The rectifying circuit part 17 will then serve to smooth the voltage across the resonant frequency part and provide a power supply storage. The rectifying circuit part 17 is sufficient to supply a sufficiently stable voltage to the memory 18 for the memory to operate.

It is possible however, when no tag 12 is sufficiently close to the reader 10, the electromagnetic field generated by the reader 10 could be coupled to other objects, particularly objects containing metal, such as a glass frame a pen or such wires as may be found on a desk. This may be undesirable. It is possible in such circumstances, the reader would not meet prescribed legal regulations or guidelines relating to the level of radiated power from radio transmitters. However, it will be apparent that simply reducing the power of the signal transmitted by the reader will reduce both the range at which the reader may operate and the power available for operation of the tag 32. An aim of the present invention is to reduce or overcome the above problem.

SUMMARY OF THE INVENTION

According to one aspect of the invention, we provide a memory tag comprising a resonant circuit part, a detector module and an output generator module, the resonant circuit part being operable to generate an output signal in response to a reader signal from a reader, the amplitude of the output signal dependent on the magnitude of the reader signal, the detector module being responsive to the magnitude of the output signal such that, when the magnitude of the output signal is relatively low, the detector module causes the output generator module to transmit an identifier signal, and when the magnitude of the output signal is relatively high, the detector module is operable to cause the tag to move to an operating mode.

The tag may comprise a memory, wherein the detector module may be operable to cause the tag to move to an operating mode by connecting the memory to the resonant circuit part.

The tag may comprise a rectifying circuit part which is responsive to the output signal of the resonant circuit part to generate an output voltage, and the detector module may be responsive to the magnitude of the output voltage.

The detector module may be operable to connect the memory to the rectifying circuit part when the output signal is relatively high and to disconnect the memory from the rectifying circuit part when the magnitude of the output signal is relatively low.

The resonant circuit part may comprise a variable capacitance element, wherein when the magnitude of the output signal is relatively low the output generator module is operable to control the variable capacitance element, and when the magnitude of the output signal is relatively high, the memory is operable to control the variable capacitance element.

The output generator module may comprise a pseudorandom binary sequence generator and wherein the pseudorandom binary sequence generator is operable to control the variable capacitance element to transmit the pseudorandom binary sequence to a reader.

The resonant circuit part may be operable to provide inductive coupling to a reader wherein the reader signal is received via the inductive coupling.

According to a second aspect of the invention, we provide a reader to read a memory tag, the reader comprising a resonant circuit part operable to transmit a reader signal to a memory tag, the reader further being operable to receive a signal from a memory tag, the reader being operable to transmit the signal to the memory tag at a first, relatively low power, and in response to an identifier signal from a memory tag, being operable to transmit a signal to the memory tag at a second, relatively high power.

A resonant circuit part and a signal generator may be operable to supply a drive signal to the resonant circuit part, the reader further comprising an amplitude modulator to control the amplitude of the drive signal supplied from the signal generator to the resonant circuit part.

An identifier signal module may be provided, operable to identify the identifier signal from the memory tag.

The identifier signal module may comprise a correlator operable to identify the identifier signal.

The reader may be operable to provide inductive coupling to the memory tag wherein the reader signal is transmitted via the inductive coupling.

According to a third aspect of the invention, we provide a method of operating a memory tag comprising the steps of detecting a signal received from a reader, and, when the magnitude of the signal is relatively low, transmitting an output identifier signal and when the magnitude of the signal is relatively high, permitting operation of the memory tag.

The step of moving to an operating mode may comprise permitting operation of a memory of the memory tag.

According to a fourth aspect of the invention, we provide a method of operating a reader for reading a memory tag comprising generating a signal having a first, relatively low power, detecting an identifier signal from a memory tag, and in response to detection of the identifier signal, generating a signal at a second, relatively high power.

BRIEF DESCRIPTION OF THE DRAWINGS

The embodiments of the present invention will now be described by way of example only with reference to the accompanying drawings wherein.

DETAILED DESCRIPTION OF THE PREFERRED EMBODIMENTS

Figure 1:
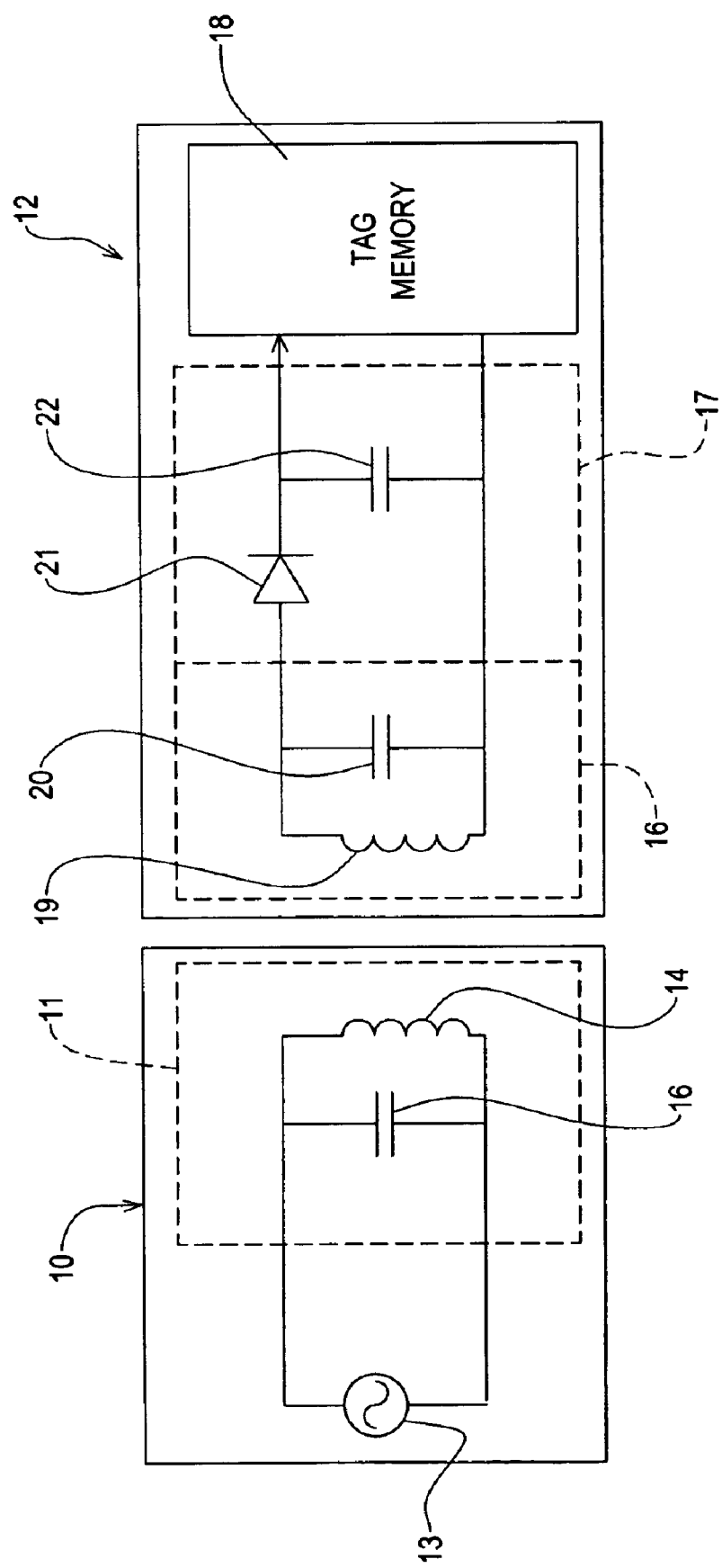
FIG. 1 is a diagrammatic illustration of a known reader and memory tag.
Figure 2:
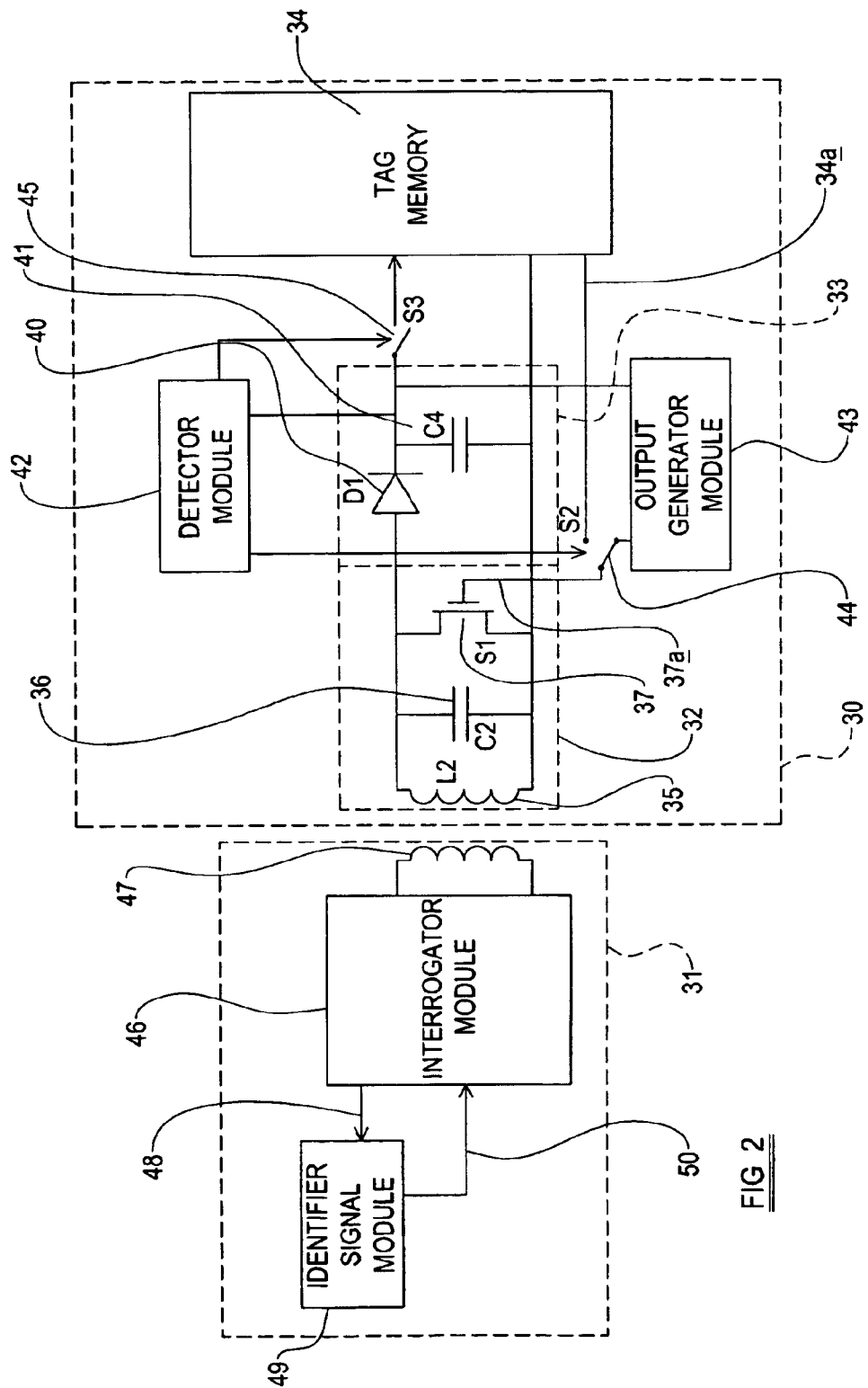
FIG. 2 is a diagrammatic illustration of a reader and a memory tag embodying the present invention.

Referring now to FIG. 2, a tag embodying the present invention is shown at 30 and a reader shown at 31. The tag 30 comprises a resonant circuit part 32 and a rectifying circuit part 33, together with a memory 34. The resonant circuit part 32 comprises an inductor L2 shown at 35 which comprises an antenna of suitable form and a capacitor L2 shown at 36 connected in parallel in like manner to the tag 12 of FIG. 1. The resonant circuit part 32 further comprises a switch S1 shown at 37 as a field effect transistor (FET) which is switchable between a high resistance, where it acts as an open switch, and a low resistance, where it acts as a closed switch, by applying an appropriate voltage to line 37a. The rectifying circuit part 33 comprises a diode D1 shown at 40 connected to the resonant circuit part 32 in a forward biased direction and a capacitor C4 shown at 41 connected in parallel with the components of the resonant circuit part 32. The rectifying circuit part 33 operates in like manner to the rectifying circuit part 17 of FIG. 1 as a half-wave rectifier to provide power to the memory 34 when the tag 30 receives a reader signal generated by the reader 31.

The tag 30 further comprises a detector module 42 and an output identifier generator 43. The detector module 42 is connected to the output of the rectifying circuit part 33. The detector module 42 is further operable to control a second switch S2 shown at 44 to connect one of the memory and the identifier signal generator module 43 to the switch S1, and a third switch S3 as shown at 45 connected between the output of the rectifying circuit part 32 and the memory 34. The detector module 42 is responsive to the magnitude of the output voltage of the rectifying circuit part 32 to control the switches S2 S3. When the output voltage has a relatively low magnitude, the detector module 42 is operable to set switch S3 open and connect switch S2 to the identifier signal module 43. When the output voltage has a relatively high magnitude, the detector module 42 is operable to cause the tag 30 to move to an operating mode by closing switch S3, connecting the memory to the rectifying circuit 32, and setting switch S2 to connect the memory 34 to the first switch S1.

The identifier signal generated by the identifier signal generator module 43 may be a pseudorandom binary sequence as discussed below, or may be any appropriate signal to indicate the presence of the tag 30, such as a repeating short sequence of bits, or a serial number corresponding to the tag 30, or indeed any other signal as desired. Different tags 30 or types of tag 30 mat be operable to generate different pseudorandom binary sequences to identify the tag 30 as well as detectably indicate the presence of the tag.

In the present example, the tag 30 is provided on a CMOS chip. The a resonant circuit part 32, excluding the antenna, and the rectifying circuit part 33 occupy an area of approximately 0.5 mm$^2$. The memory 34 in this example is a non-volatile memory providing 1 Mbit of capacity and is of an area of approximately 1 mm$^2$. The memory may for example use FRAM (ferroelectric random access memory) or MRAM (magnetoresistive random access memory). The antenna is provided on the chip and may have only a few turns, for example 5, or in this case one turn. The tag 30 will be of generally square shape in plan view and have an external dimension D for the length of each side of approximately 1 mm The reader 31 comprises an interrogator module 46 connected to an inductor 47 in the present example an antenna, to provide inductive coupling between the tag 30 and the reader 31. When the switch S1 is closed, it causes an increased current to flow in the resonant circuit part 32, which can be detected by the reader 31 as a drop in voltage across the inductor 47 providing a data output 48. The reader 31 further comprises an identifier signal module 49 connected to the data output 48 operable to identify the identifier signal transmitted by the tag 30 and generate a high power instruction on line 50. The interrogator module 46 is operable to supply a signal to the inductor 47 at a first, relatively low power and, in response to the high power instruction received on line 50, to supply a signal to the inductor at a second relatively high power.

As discussed above, the tag 30 will have a dimension D of about 1 mm, and the reader 31 will be operable to communicate with the tag over a relatively short range, for example approximately 2D, but the distance over which the tag 30 and reader 31 can communicate effectively will vary with the exact details of their construction.

The tag 30 and reader 31 are operable as follows. The reader 31 is initially in "search mode", that is a tag 30 is not sufficiently close to the antenna 47 for inductive coupling to occur. The interrogator module 46 generates an output reader signal of relatively low power.

When a tag 30 comes sufficiently close to the antenna 47 to provide inductive coupling, for example within about 2D, the reader signal will cause the rectifying circuit part 32 to generate an output voltage having a relatively low magnitude as discussed hereinbefore. The detector module 42 will cause switch S3 to be open and switch S2 connected to the identifier signal generator module 43 as shown in FIG. 2. Sufficient power will be supplied to the tag 30 to operate the identifier signal generator module 43 such that it transmits an appropriate identifier signal. Conveniently, the identifier signal operator module 43 will comprise a pseudorandom binary sequence generator which may simply be assembled out of a shift register and XOR gates in known manner. Such a functionality will require very little power to operate, particularly when provided as part of a CMOS integrated circuit. The module 43 modulates the resonant frequency of the resonant circuit part 32 by operating the switch S1 in accordance with the pseudorandom binary signal. For example, the output of the identifier signal operator module 43 may simply be a series of pulses of relatively high or low voltage encoding the bits of the identifier signal passed to the switch S1. The switch S1 will be open or closed depending on the voltage of the signal, thus transmitting the identifier signal to the reader 31. The interrogator 46 transmits the received data 48 to the identifier signal module 49. On detecting the identifier signal from the tag 30, the identifier signal module 49 will send a high power instruction on a line 50 to the interrogator 46 to switch to high power operation. The interrogator 45 will then send a relatively high power signal to the antenna 47. This will cause the rectifying circuit part 32 to generate a signal comprising an output voltage having a relatively high magnitude which is detected by the detector module 42. The detector module 42 then closes switch S3, connecting the memory 34 to the rectifying circuit part 32, and toggles switch S2 to connect the memory 34 to first switch S1. The tag 30 may then operate to read data from the memory 34 to the reader 31. In particular, a program stored in the memory 34 may be operable to read data held in the memory 34 and control the switch S1 by transmitting a signal having a particular voltage on line 34a, for example encoding binary digits by pulses of relatively high or low voltage.

Figure 3:
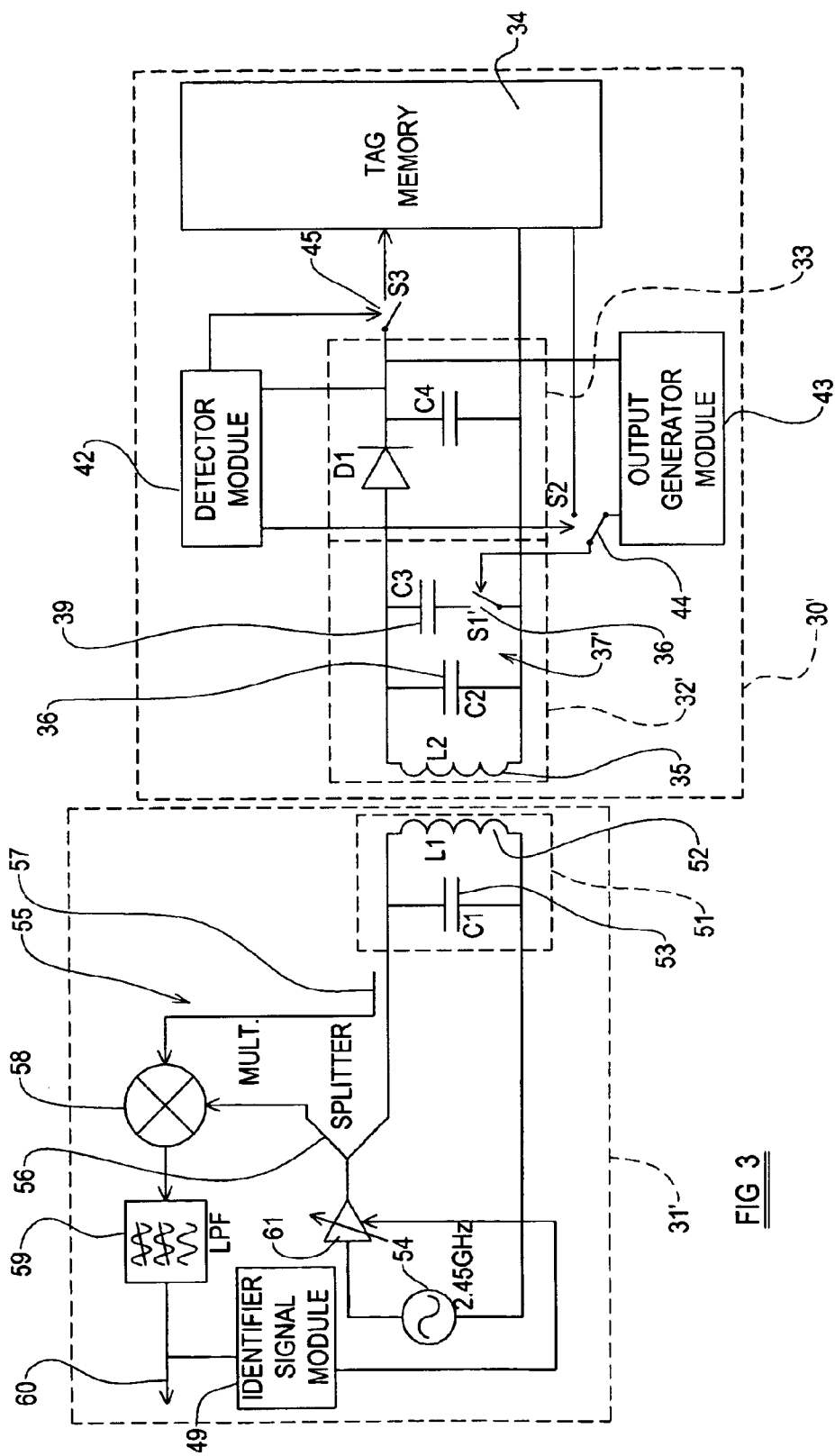
FIG. 3 is a diagrammatic illustration of a particular reader and memory tag embodying the present invention.

Referring now to FIG. 3, a particular embodiment of a memory tag and reader are shown at 30' and 31' respectively. The reader 31' comprises a resonant circuit part 51 which comprises an inductor L1 shown at 52, in this example an antenna and a capacitor C1 shown at 53 connected in parallel. A signal generator 54 is connected to the resonant circuit part 51 to provide a drive signal.

The reader 31' further comprises a demodulator, generally shown at 55. The demodulator 55 comprises a splitter 56 connected to the frequency generator to split off a part of the drive signal to provide a reference signal. A coupler 57 is provided to split off part of a reflected signal reflected back from the resonant circuit part 51, and pass the reflected signal to a multiplier shown at 58. The multiplier 58 multiplies the reflected signal received from the coupler 57 and the reference signal received from the splitter 56 and passes the output to a low pass filter 59. The low pass filter 59 passes the signal corresponding the phase difference between the reference signal and the reflected signal to an output 60. An amplitude modulator is shown at 61 operable to control the amplitude of the drive signal supplied from the frequency generator 54 to the resonant circuit part 51.

The memory tag 32' is the same as the memory tag 32 of FIG. 2 except that the switch S1 37 has been replaced with a variable capacitance element generally indicated at 37' comprising a switch S1' shown at 38 and a capacitor C3 shown at 39. Operation of the switch S1' 38 will switch the capacitor C3 in and out of the resonant circuit part 32', thus changing the resonant frequency of the resonant circuit part 32' causing a relative phase shift in the signal reflected from the resonant circuit part 51. The switch S1' may comprise an FET and be operable in like manner to the switch 37 as discussed herein before.

In the reader 31' the reference signal from the splitter 56 will be of the form $$S(t)=A\cos(\omega t)$$

and the reflected signal R(t) will be of the form $$R(t)=a\cos(\omega t+\phi(t))$$

where
  A=amplitude of the reference signal,
  a=amplitude of the reflected signal
  $\phi(t)$=the relative phase and
  $\omega$=the frequency of the drive signal generated by the frequency source 45.
R(t) is multiplied by the carrier reference signal S(t) at the multiplier 58, producing a resulting signal $$a\frac{A}{2}\cos(2\omega t+\varphi(t))+a\frac{A}{2}\cos(\varphi(t))$$

The first of these terms, the second harmonic, is simply filtered by the low pass filter 59 leaving the second term that comprises the phase difference between the reference and reflected signals. It is a known effect of resonant circuits that when the circuit passes a signal which has a frequency less than the resonant frequency of the circle, a phase lag is introduced to the signal frequency, whilst when the frequency is greater than that of the resonant circuit, a phase lead is induced. Thus, by modulating the frequency of the reflected signal by changing the resonant frequency of the resonant circuit part 32' of the tag 30', the reflected signal will have a phase difference relative to the reference signal from the frequency source 54 which may easily be measured by the demodulator as discussed above.

An identifier signal module is shown at 49 connected to the output 60 and operable to control the amplitude modulator 61. In this example, the identifier signal module comprises a correlator. Correlators are particularly useful for identifying weak repetitive signals, and in this example the correlator 48 is operable to identify the pseudorandom binary sequence transmitted by the tag 30. The correlator is operable to control the amplitude modulator 55 to switch the modulator between a relatively low amplitude signal and a relatively high amplitude signal to generate a relatively low or relatively high amplitude output.

The embodiment of FIG. 3 is particularly advantageous in that the data is transmitted from the memory tag 30' without significantly affecting the output voltage of the rectifying circuit part 33, and the correlator 49 simply receive the identifier signal from the demodulator 55 used to read data from the tag 30'.

The reader 31, 31' may be provided as a device or a component of a device having any appropriate function or application as desired. For example, a reader might comprise a device whose intended principle function is simply to act as a stand-alone reader. The small size of the reader would permit it to be intergrated into small devices, such as a key fob or pen. The reader may have a display or other understandable output means, or may be suitably adapted to connect another device. It might be envisaged for example that a reader is provided with a suitable memory into which the contents of the memory of a tag are read, and an interface to enable the reader to be connected to another device such as a personal computer to enable the content of the reader memory to be downloaded.

A reader might be provided with a connection to a computer, such that the reader functions as a peripheral of the computer operable to read a tag and supply the read information to the computer for any appropriate application, or indeed write information to the tag. In this example, it might be envisaged that the reader be provided on a computer mouse or a keyboard. It might also be envisaged that a printer be provided with a reader, such that the printer could retrieve a document stored on a tag and print a copy of the document.

A reader may also be provided integrated in or provided as part of a portable device. For example, a personal digital assistant (PDA) might be provided with a reader such that a user may read from and write to a memory tag with the reader and view the retrieved information on a screen of the PDA. Similarly, it might be envisaged that a reader might be built into a mobile telephone, or be connectable thereto to enable information transmitted via the mobile telephone to be read from or written to the memory tag, and made available to a user via the screen of the telephone or as an audible output.

In all of the examples, it will be apparent that the information read from or written to the memory tag may comprise any appropriate type or format as desired, for example text, images, programs, sound files or movie files.

It will of course be apparent that the reader 31 31' may be provided with any appropriate implementation as desired to switch between a relatively low power search mode and a relatively high power mode where data may be read from or to the tag 30. In a preferred embodiment, the resonant frequency of the resonant circuit part 42, and hence the frequency of the signal generated by the frequency source 45 is about 2.45 GHz, and the resonant frequency of the resonant circuit part 32 is modulated by about 0.05 GHz either side of this reference frequency. At this frequency, component values for the inductors for the capacitors are small, allowing easy integration of the circuit and require relatively small early areas of silicon on an integrated circuit. It is particularly desirable that the circuit for the memory tag 30 30' be provided as a integrated circuit, for example as a CMOS integrated circuit. Switches S1', S2, S3 may advantageously be provided as field effect transmitters which are particularly suitable for provision as part of a CMOS integrated circuit.

The tag 30 30' is particularly advantageous in that it may be used with a CMOS integrated circuit. It is known that the power requirements of a CMOS integrated circuit are proportional to the square of the operating voltage, the capacitance of all the gates found on the circuit and the operation frequency. The pseudorandom binary sequence generator 43 may operate at a relatively low rate, for example on the order of 100 kilobits per second instead of 10 megabits per second for the normal read/write operation of the tag, and may be relatively simply implemented to, for example, provide a repeating sequence of 127 bits at a relatively low power. The correlator 49 is operable to detect the sequence of 127 bits with high confidence, even though the signal generated by the tag may be generated at a relatively low power.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A memory tag comprising a resonant circuit part, a detector module and an output generator module, the resonant circuit part being operable to generate an output signal in response to a reader signal from a reader, the magnitude of the output signal being dependent on the magnitude of the reader signal, the detector module being responsive to the magnitude of the output signal such that, when the magnitude of the output signal is relatively low, the detector module causes the output generator module to transmit an identifier signal which is configured to cause the reader to increase the magnitude of the reader signal from a first level to a second relatively high level, and when the magnitude of the output signal is relatively high as a result of the tag receiving the second relatively high magnitude reader signal from the reader, the detector module is operable to cause the tag to move to an operating mode.

2. A memory tag according to claim 1 comprising a memory, wherein the detector module is operable in response to the reader signal being at the second relatively high level, to cause the tag to move to the operating mode by connecting the memory to the resonant circuit part.

3. A memory tag according to claim 1 comprising a rectifying circuit part responsive to the output signal of the resonant circuit part to generate an output voltage, and wherein the detector module is responsive to the magnitude of the output voltage.

4. A memory tag according to claim 3 wherein the tag comprises a memory and wherein the detector module is operable to move the tag to an operating mode by connecting the memory to the rectifying circuit part when the output signal is relatively high, and operable to disconnect the memory from the rectifying circuit part when the magnitude of the output signal is relatively low.

5. A memory tag according to claim 1 wherein the resonant circuit part comprises a switch, wherein when the magnitude of the output signal is relatively low the output generator module is operable to control the switch to transmit the identifier signal, and when the magnitude of the output signal is relatively high, the memory is operable to control the switch.

6. A memory tag according to claim 1 wherein the output generator module comprises a pseudorandom binary sequence generator to generator an identifier signal comprising a pseudorandum binary sequence.

7. A memory tag according to claim 1 wherein the resonant circuit part is operable to provide inductive coupling to a reader wherein the reader signal is received via the inductive coupling.

8. A memory tag comprising a resonant circuit part, a detector module, an output generator module and a memory, the resonant circuit being operable to generate an output signal in response to a reader signal from a reader, the magnitude of the output signal being dependent on the magnitude of the reader signal, the detector module being operable in response to the output signal such that when the magnitude of the output signal received by the memory tag is relatively low, the detector module causes the output generator module to transmit an identifier signal configured to induce the reader to increase the magnitude of the reader signal from a normal finite level to a higher level, and when the magnitude of the output signal is relatively high in response to the magnitude of the reader signal being increased to the higher level, the detector module is operable to connect the memory to the resonant circuit part.

9. A reader to read a memory tag, the reader being operable to transmit a reader signal to a memory tag, the reader further being operable to receive a signal from a memory tag, the reader:

being operable to transmit the reader signal to the memory tag at a first, relatively low power, and in response to an identifier signal being issued from the memory tag in response to receipt of the reader signal having the first relatively low power, and being operable to transmit a reader signal to the memory tag at a second, relatively high power whereby the reader is switched from a low power search mode to a high power read mode.

10. A reader according to claim 9 comprising a resonant circuit part and a signal generator operable to supply a drive signal to the resonant circuit part, the reader further comprising an amplitude modulator to control the amplitude of the drive signal supplied from the signal generator to the resonant circuit part.

11. A reader according to claim 9 comprising a output signal identifier module, operable to identify the identifier signal from the memory tag.

12. A reader according to claim 11 wherein the reader comprises a correlator operable to identify the identifier signal.

13. A reader according to claim 9 operable to provide inductive coupling to the memory tag wherein the reader signal is transmitted via the inductive coupling.

14. A reader to read a memory tag, the reader comprising a resonant circuit part, an interrogator, and an identifier signal module, the interrogator module being operable to transmit a reader signal at a first, relatively low power to a memory tag, receive a signal from the memory tag which is generated by the memory tag in response to receipt of the first, relatively low power reader signal, and pass the received signal to the identifier signal module, the identifier signal module being operable to identify the identifier signal and generate an instruction to the interrogator module to generate a reader signal at a second, relatively high power.

15. A system comprising a memory tag and a reader, the memory tag having a resonant circuit part, a detector module, an output generator module and a memory holding data, the reader comprising a resonant circuit part operable to transmit a reader signal to the memory tag and receive a signal from the memory tag, the reader being operable to transmit a reader signal to the memory tag at a first relatively low power wherein, the resonant circuit part of the memory tag, in response to the reader signal, generates an output signal having a first, relatively low magnitude, the detector module is responsive to the first relatively low magnitude of the output signal to cause the output generator module to transmit an identifier signal, the reader is operable to receive the identifier signal from the memory tag and identify the identifier signal, and generate a reader signal at a second, relatively high power, the resonant circuit part of the tag is operable to generate an output signal having a second, relatively high magnitude, the detector module being responsive to the output signal having a second, relatively high magnitude to connect the memory to the resonant circuit part, and the memory tag is operable to send a signal to the reader to transmit the data held in the memory to the reader.

16. A method of operating a memory tag comprising the steps of detecting a reader signal received from a reader, and, when the magnitude of the reader signal received by the tag is relatively low, transmitting an output identifier signal from the tag to the reader to induce the reader to increase the power of the reader signal, and when the magnitude of the reader signal received by the tag is relatively high as a result of the reader receiving the output identifier signal, moving to an operating mode by using the received reader signal with the relatively high magnitude, to energize the memory tag.

17. A method according to claim 16 wherein the step of moving to an operating mode comprises permitting operation of a memory of the memory tag.

18. A memory tag comprising a resonant circuit part, a detector module and an output generator module, the resonant circuit part being operable to generate a first relatively low magnitude output signal and a second relatively high magnitude output signal respectively in response to a first reader signal and a second reader signal which are respectively issued from a reader at first and second power levels, the magnitude of the first output signal being variable with the magnitude of the first reader signal which is lower in power than the second reader signal, the detector module being responsive to the relatively low magnitude of the first output signal such that the detector module transmits an identifier signal which is configured to induce the reader to issue the second relatively high power level reader signal, and in response to the second output signal, which is induced by the second relatively high power level reader signal, the detector module is operable to cause the tag to move to an operating mode.

19. A memory tag according to claim 18 comprising a memory, wherein the detector module is operable to cause the tag to move to an operating mode by connecting the memory to the resonant circuit part.

20. A memory tag according to claim 18 comprising a rectifying circuit part responsive to the first and second output signals of the resonant circuit part to generate respective output voltages, and wherein the detector module is responsive to the respective magnitudes of the output voltages.

21. A memory tag according to claim 20 wherein the tag comprises a memory and wherein the detector module is operable to energize the tag into the operating mode by connecting the memory to the rectifying circuit part in response to the second output signal, and operable to disconnect the memory from the rectifying circuit part in response to the first output signal.

22. A memory tag according to claim 18 wherein the resonant circuit part comprises a switch, wherein in response to the first output signal, the output generator module is operable to control the switch to transmit the identifier signal, and in response to the second output signal, the memory is operable to control the switch.

23. A memory tag according to claim 18 wherein the output generator module comprises a pseudorandom binary sequence generator to generator an identifier signal comprising a pseudorandum binary sequence.

24. A memory tag according to claim 18 wherein the resonant circuit part is operable to provide inductive coupling to a reader wherein the reader signal is received via the inductive coupling.

25. A method of operating a reader for reading a memory tag comprising:

generating a reader signal normally having a first, relatively low power during a low power search mode, detecting an identifier signal from a memory tag which is produced by the memory tag in response to receipt of the reader signal having the first relatively low power, and inducing a high-power read mode by generating, in response to detection of the identifier signal, a reader signal at a second, relatively high power to excite the memory tag into an operating mode wherein data can be transmitted from the memory tag and read by the reader.

26. A method according to claim 25, wherein the step of exciting the memory tag into an operative mode comprises: connecting a memory to a resonant circuit in response to the reader signal being at the second relatively high level.

27. A method according to claim 26 further comprising:

using a rectifying circuit part responsive to the output signal of the resonant circuit to generate an output voltage, and using the output voltage to control a detector module.

28. A method according to claim 25 wherein the tag comprises a memory and a detector module and wherein the detector module is operable to excite the tag into an operating mode by:

connecting the memory to a rectifying circuit when the output signal is relatively high, and disconnecting the memory from the rectifying circuit part when the magnitude of the output signal is relatively low.

* * * * *